United States Patent
Najmi et al.

(10) Patent No.: US 12,524,057 B2
(45) Date of Patent: Jan. 13, 2026

(54) ENERGY CONSUMPTION MANAGEMENT OF A UNIT

(71) Applicant: Orange, Issy-les-Moulineaux (FR)

(72) Inventors: Elyass Najmi, Chatillon (FR); Halim Bendiabdallah, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 181 days.

(21) Appl. No.: 18/345,717

(22) Filed: Jun. 30, 2023

(65) Prior Publication Data

US 2024/0004451 A1    Jan. 4, 2024

(30) Foreign Application Priority Data

Jul. 1, 2022 (FR) ..................... 2206704

(51) Int. Cl.
*G06F 1/32* (2019.01)
*G06F 1/3209* (2019.01)
*H04L 12/66* (2006.01)

(52) U.S. Cl.
CPC ........... *G06F 1/3209* (2013.01); *H04L 12/66* (2013.01)

(58) Field of Classification Search
CPC ................. G06F 1/3209; H04L 12/66
See application file for complete search history.

(56) References Cited

U.S. PATENT DOCUMENTS

| | | | |
|---|---|---|---|
| 10,852,705 B1* | 12/2020 | Conley | G05B 19/042 |
| 2009/0150695 A1* | 6/2009 | Song | G06F 1/00 713/323 |
| 2017/0104633 A1* | 4/2017 | Wen | H04L 43/062 |
| 2018/0120923 A1 | 5/2018 | Srinivasan | |

OTHER PUBLICATIONS

French Search Report for French Application No. FR 2206704 dated Feb. 6, 2023.
Free website tool for Automatic extract of English subtitles, Apr. 7, 2022, URL: https://www.downloadyoutubesubtitles.com/fr/?u=https%3A%2F%2Fwww.youtube.com%2Fwatch%3Fv%3DbRkpB5Dpbv0.
French Written Opinion for French Application No. FR2206704 dated Feb. 13, 2023.
Orange, "Orange and me: the notification center", Jan. 19, 2022, screenshots from the YouTube video referenced in Citation 1 of the IDS list form dated May 23, 2025.

\* cited by examiner

*Primary Examiner* — Stefan Stoynov
(74) *Attorney, Agent, or Firm* — Knobbe, Martens, Olson & Bear, LLP

(57) ABSTRACT

A method for driving the supply of an access gateway, and an access gateway implementing the method and allowing at least one device of a local network to access a wide communication network. The method includes: a) obtaining a scheduled supply mode based on a current date; b) analyzing data routed by the access gateway; and c) if the analyzed data meets conditions corresponding to the scheduled supply mode, ordering switching to the scheduled supply mode.

12 Claims, 2 Drawing Sheets

ENERGY CONSUMPTION MANAGEMENT OF A UNIT

CROSS-REFERENCE TO RELATED APPLICATIONS

This application claims foreign priority to French Patent Application No. FR 2206704, entitled "ENERGY CONSUMPTION MANAGEMENT OF A UNIT" and filed Jul. 1, 2022, the content of which is incorporated by reference herein in its entirety.

BACKGROUND

Technical Field

The present disclosure relates to the field of energy use moderation.

Description of Related Art

Adapting the energy consumption of some electric units based on their use is known. This is, for example, common among televisions, display screens or office computers which have functions for moderating their energy consumption. In current language, the term "standby mode" is generally used. Other units do not have such functions, often because it is thought that their use is continuous or nearly continuous, or because limiting access of some electronic components to energy would tend to wear them out in the long term. This is particularly true for telecom network equipment, whose units form access gateways between networks or parts of a single network, for example multi-function units which are commonly called "Internet boxes."

SUMMARY

The applicant has gone against these preconceptions: the present disclosure serves to improve the situation.

A method is proposed for driving the supply of an access gateway. The gateway allows at least one device of a local network to access a wide communication network. The method is implemented by the access gateway and comprises: a) obtaining a scheduled supply mode based on a current date; b) analyzing data routed by the access gateway; c) if the analyzed data meets conditions corresponding to the scheduled supply mode, ordering switching to the scheduled supply mode.

According to another aspect, a unit comprising an access gateway is proposed. The gateway allows at least one device of a local network to access a wide communication network. The unit is configured for: a) obtaining a scheduled supply mode based on a current date; b) analyzing data routed by the access gateway; c) if the analyzed data meets conditions corresponding to the scheduled supply mode, ordering switching to the scheduled supply mode.

According to another aspect, a computer program is proposed comprising instructions for implementing all or part of the method as defined herein when this program is executed by a processor. According to another aspect, a computer-readable nonvolatile recording medium on which such a program is recorded is proposed.

The characteristics disclosed in the following paragraphs may, optionally, be implemented independently of each other or in combination with each other:

The method further comprises: d) if the conditions are not met, sending a notice intended for a device distinct from the access gateway. This way a user can be informed in real time of the correct implementation of the method, or of not triggering changing supply mode and of reasons for not triggering. Although the method is automated, the user is still informed and involved with the objective of reducing the energy consumption. By being informed, the user is better able to refine the conditions/criteria corresponding to each scheduled supply mode.

The method further comprises: e) in case of receiving an order in response to sending the notification, ordering switching to the scheduled supply mode. This way a user can force switching one time to a planned mode with full awareness why, and can therefore provide a flexibility compared to the preestablished conditions/criteria without going so far as changing the condition/criteria for following iterations. This also makes it easier for an individual to control and regulate consumption for the benefit of a group of users, typically the adults responsible for a household.

The analysis of the data routed by the access gateway includes at least one of the following actions: detection of encapsulation of data according to predefined formats or standards; detection of HTTP and/or HTTPS requests; detection of RTCP frames; detection of physical ports used for routing data; detection of software ports used for routing data; detection of packets corresponding to voice transiting under IP protocol; and/or detection of packets corresponding to video transiting under IP protocol. The configuration and the reduction of energy consumption as a function of actual use can be refined this way instead of based on quantities of energy which might otherwise be difficult to associate with a specific use. By doing that, the user, with use, arrives at a knowledge and awareness of their own use and how they can, by adapting it, participate in energy use moderation.

The method further comprises: f) identifying one or several processor cores of the access gateway unused on the current date and deactivating said one or several unused processor cores.

In addition to the plant supplied modes, unnecessary energy consumption can be eliminated this way without requiring any specific action by a human.

Obtaining the scheduled supply mode is done among several ordered supply modes that are ordered relative to each other based on energy consumption associated with each mode, and wherein c') If conditions corresponding to the scheduled supply mode are not met by the analyzed data; and if conditions corresponding to a supply mode associated with a greater energy consumption than that associated with the scheduled supply mode are respected, ordering switching to said supply mode associated with a greater energy consumption than that associated with the scheduled supply mode The adjustment of the energy consumption to the use can be further refined this way. In other words, the consumption reduction is made gradual instead of binary: the best suited supply mode may be applied at any moment.

There are at least four supply modes, and each is associated with an energy consumption distinct from the other modes. The adjustment of the energy consumption can be further refined this way. Other than the two extremes which are completely power off and unlimited consumption, it is possible to provide two different adjustment levels, meaning, and ordinary language, to "standby" modes instead of only one.

The process further comprises a loop such that the method is reiterated so as to be implemented periodically or continuously. A better responsiveness of the gateway to changes in use can be provided this way. The latency between a change of use and the adaptation of the supply mode which may result from it may be reduced in order to further reduce unnecessary energy consumption or at least less necessary.

BRIEF DESCRIPTION OF THE DRAWINGS

Other characteristics, details and advantages will appear upon reading the following detailed description, and analyzing the attached drawings, on which.

DETAILED DESCRIPTION OF CERTAIN ILLUSTRATIVE EMBODIMENTS

Figure 1:
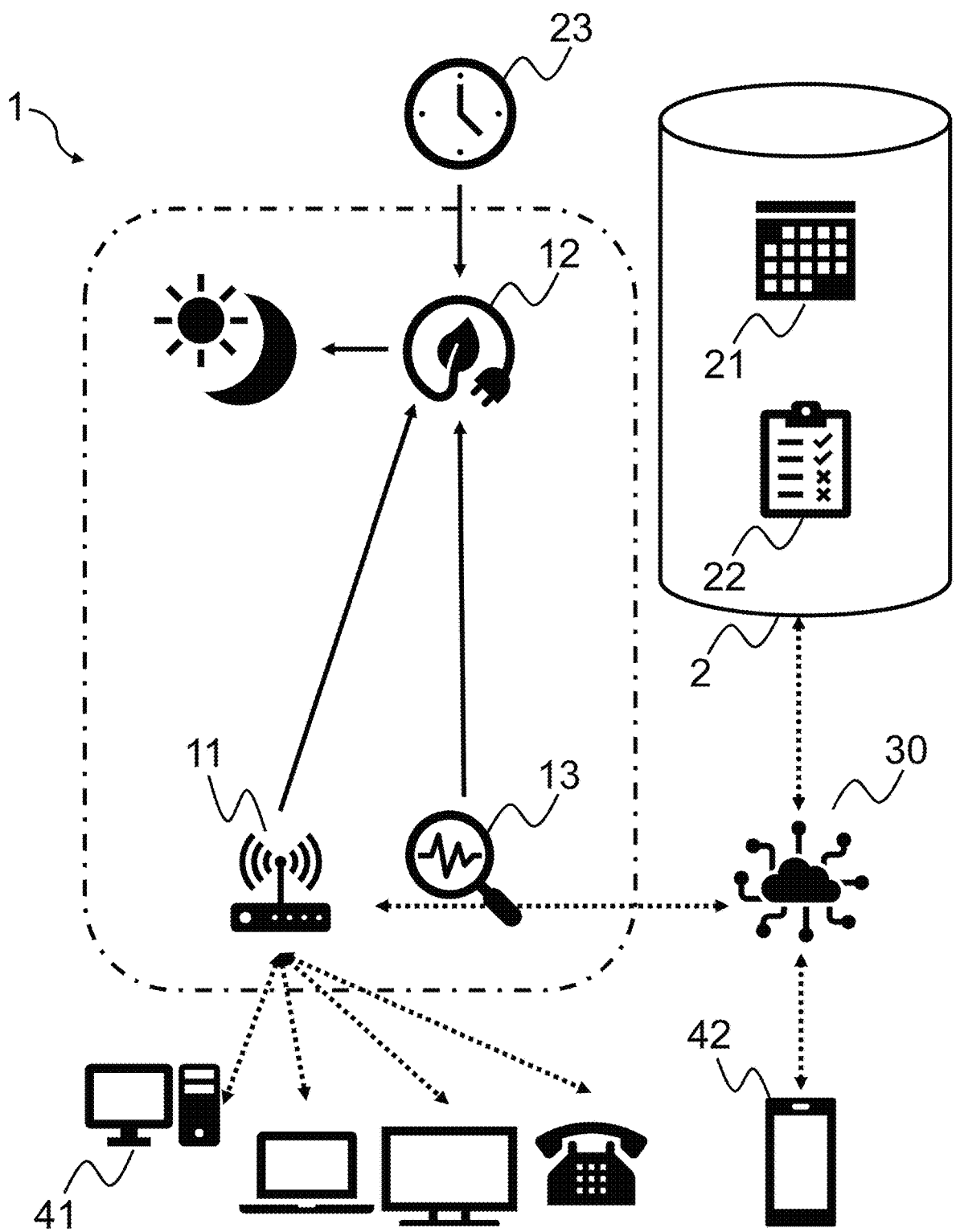
FIG. 1 shows a schematic example of a unit in the environment thereof according to an embodiment.

Referring now to FIG. 1. In FIG. 1, components of an electrical unit are shown schematically in the unit environment. Here "electronic unit" designates any device operating with an electric energy source, whether external (outlet or external battery for example) or internal (internal battery for example). The electronic unit comprises an access gateway 1. The access gateway 1 is a component of the unit able to make data transit between other components or peripherals of the unit and or third-party devices distinct from the unit. During operation, the access gateway 1 forms for example a relay for one network or between two parts of a single network. In the example shown in FIG. 1, the access gateway 1 forms both an interface between third-party devices 41, 42, distinct from the unit and connected to a communication network referred to as "local" and also an interface between the local network and a wide communication network 30 such as an IP or Internet network. The access gateway 1 routes data packets between the local network devices and also between a device on the local network and a device accessible via the wide communication network.

The access gateway 1 for example comprises a communication module 11 able to interface with third-party devices, including devices 41, 42 via corresponding networks and protocols. For example, the communication module 11 includes a modem. The communication module 11 is arranged in order to allow wired or unwired communication, according to well-known standards such as IP protocols, PCL (for "Powerline Communication"), IEEE 802.11 standards or Wi-Fi (for "Wireless Fidelity"), Bluetooth, USB (for "Universal Serial Bus") and LiFi (for "Light Fidelity").

Here the devices 41, 42 designate any electronic device distinct from the access gateway 1 suited for connecting to it and exchanging data in the local network or via the wide communication network by means of the access gateway 1. The devices 41, 42 may for example include computers, tablets, smart phones, televisions, telephone handsets, or even peripherals including peripherals arranged essentially for emitting or essentially for receiving data via the access gateway 1 such as sensors, microphones, cameras, speakers or display screens. One or more devices 41 may be used for purposes such as telephony, including over IP protocol, or viewing live or on demand audiovisual programs (VOD for "Video on Demand") by means of the access gateway 1.

The access gateway 1 further has access to at least one database 2. In the example from FIG. 1 and in the remainder, to improve understanding, the database 2 was presented as being unique and distinct from the access gateway 1. It is for example stored on a remote server and distinct from the unit, which the access gateway 1 accesses by means of the communication module 11 and via the wide communication network 30. As a variant, the database 2 may be distributed to or duplicated on several distinct storage media. At least some of the storage may take the form of memory components internal to the access gateway 1 or to the unit.

At least one schedule 21 and one matching table 22 are stored in the database 2. The schedule 21 includes a set of data defining a link between date ranges and supply modes for the access gateway 1. The form of the schedule 21 is for example a weekly calendar in which timeslots are associated with planned supply modes. Preferably, the schedule 21 is accessible for reading and changing by at least one user of the access gateway 1 by means of a terminal such as a computer or smart phone by means of a human-machine interface. In that way, the terminal connects to the database 2 either through a local network of the access gateway 1, or through an external network such as the Internet and/or a mobile telephone network. In that way, the user may freely change the schedule 21 in order to adapt it to their needs and plans. If the schedule 21 is not updated by a user, default supply modes may be assigned to various timeslots.

The matching table 22 for its part includes a set of data defining, for each supply mode and/or each timeslot, a set of parameters (or conditions) to confirm and relating to the data passing through the access gateway 1. Preferably, the matching table 22 is accessible for reading and changing by at least one user of the access gateway 1 by means of a terminal such as a computer or smart phone by means of a human-machine interface. In that way, the user may freely change the matching table 22 in order to adapt (or limit to one time) the implementation of the schedule based on use at each moment. If the matching table 22 is not updated by a user, default parameters may be preestablished.

The implementation of the schedule with verification of the parameters or conditions will be described in more detail with reference to FIG. 2.

The access gateway 1 further comprises a supply management module 12 and a module 13 for analyzing data passing through the access gateway 1. The supply management module 12 is configured for driving the supply for the access gateway 1. In other words, the supply management module 12 receives data on input, from the analysis module 13 in particular, and orders, on output, switching from one supply mode to another.

The analysis module 13 is configured for analyzing data type passing through the access gateway 1 so as to deduce therefrom whether the parameters (or conditions) defined in the matching table 22 are met, or not. The analysis module 13 therefore supplies on output, input signals for the supply management module 12 which it is able to interpret. As a nonlimiting example, the analysis module 13 may for example be configured for analyzing the data flows passing through the access gateway 1 and detecting therein, for example: data encapsulation according to predefined formats/standards and known to correspond to audiovisual flows such as MPEG2-TS ("Moving Picture Experts Group 2 Transport Stream") multiplexing audio and video flows (the reader is invited to consult the ETSI 13818-1:2018 standard which defines such encoding more precisely); HTTP requests ("Hypertext Transfer Protocol") or HTTPS, for secured HTTP; RTCP frames ("Real-Time Transport Control Protocol").

Of course, the preceding examples could be done by a person skilled in the art based on typical communication uses and standards. In particular, the detection (or non-detection) of some data types may be converted into information aiming to describe an associated type of use in progress. For example, detection of an audiovisual flow such as MPEG2-TS may be compared to a VOD type use. HTTP/HTTPS requests may be compared to browsing the Internet use via a browser without audiovisual content. RTCP frames may be compared to a communication use by voice over IP (or IP telephony or VoIP).

In practice, in the matching table 22, the parameters relating to data passing through the access gateway 1 correspond to those coming from the analysis module 13, either in raw form (the detected data type) or indirectly in the form of use deduced from the detected data type. Converting raw data from the analysis into information about use helps a non-specialist user update the matching table 22. In other words, it is easier for the user to select the parameters from the matching table 22 by selecting uses such as telephony, VOD or browsing the Internet instead of selecting technical parameters such as the standards used for exchanging the data. The conversion of raw data may be implemented by the analysis module 13 or else by the supply management module 12 itself. In this last case, there may not be an analysis module 13 or it may be considered as a submodule of the supply management module 12.

The access gateway 1 further comprises an internal clock 23. As a variant, the access gateway 1 remotely accesses a clock. The access gateway 1 can know the current date by means of the internal clock 23. It is indicated here that the term "date" is used in a broad meaning: the date may include a precision greater than one day, for example including the hour, minutes and seconds. The current data obtained by the access gateway 1 may be compared to the schedule 21 as will be described later.

Figure 2:
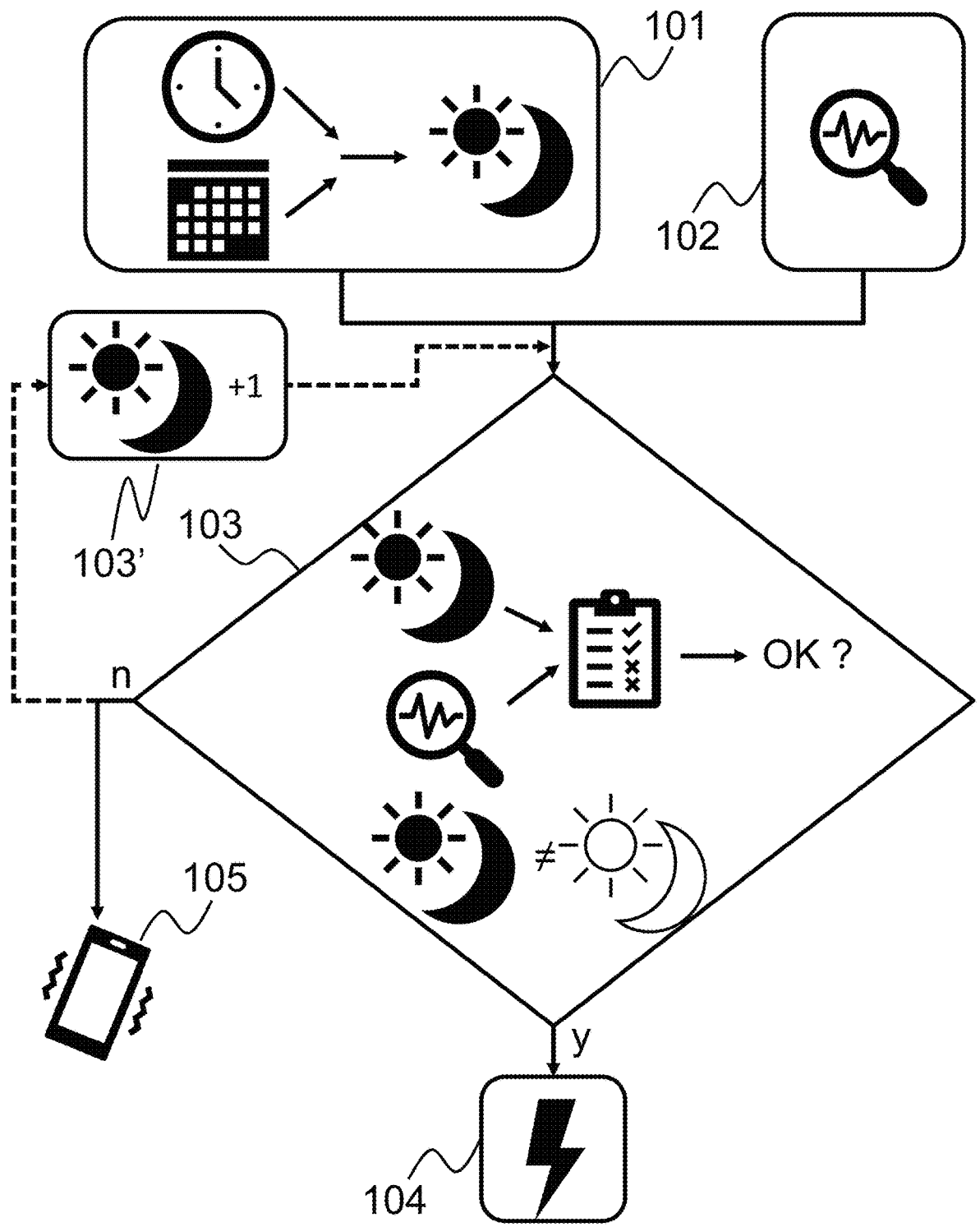
FIG. 2 shows a diagram for implementation of a method according to an embodiment.

Referring now to FIG. 2. To improve understanding, the numeric references previously used are reused in the remainder for designating elements which may be similar. FIG. 2 schematically shows a method for driving the supply of an access gateway 1. The access gateway 1 allows at least one device 41 of a local network to access a wide communication network 30 such as the Internet. The access gateway 1 may for example be the one described with reference to FIG. 1. The following method is implemented by said access gateway 1.

In a first operation 101, a scheduled supply mode is obtained based on a current date. In the example described here, the supply management module 12 receives the current date as input from the internal clock 23. The supply management module 12 also receives, on input from the database 2, the schedule 21. By comparing the current date and the schedule 21, a scheduled supply mode is deduced. For example, if the current date corresponds to a Thursday at 10 PM, and the schedule 21 indicates that a timeslot from 8 PM to 10 PM every Thursday is associated with the supply mode called "deep standby," then the scheduled supply mode is that of "deep standby."

In a second operation 102, data routed by the access gateway 1 are analyzed, for example by the analysis module 13. Here, the data routed means the data, or data flow, which are exchanged by one or more devices 41, 42 on the local network between them or with the wide communication network 30. The analysis implemented may be limited to determining the type or nature of the data without however involving determining the information carried by said data. For example, for HTTP data, an HTTP header label can be used to determine the version used and to deduce from that a use for Internet browsing via a browser. Still as an illustrative example, the MPEG2-TS data indicate the flow type encapsulated in the video flow, thus making it possible to determine whether it involves an audio or video flow. As for the RTCP data, only the timestamps are read. For example, it is not necessary to decrypt the encrypted data such that the confidentiality of the exchanges is preserved. The level of detail of the analysis however makes it possible to distinguish several different uses as explained above (telephony, VOD, reading webpages, etc.). The analysis may also include detection of communication channels used, for example by distinguishing the physical and/or software ports used. Thus, for example, an exchange of data via a specific network j ack (such as RJ-45) may allow deducing an activity on a game console previously associated with that jack. An exchange of data through "port 80" may allow deducing use of a web browser. A set of rules for deductions may be established by default and/or be configured in order to adapt to an application context, either by a user, an operator or even by means of software bricks intended for such a function. The results of the analysis are for example provided by the analysis module 13 to the supply management module 12.

It is specified that the operations 101 and 102 are called "first" and "second" solely for distinguishing them from each other without that implying a time sequence of implementation of one relative to the other. In fact, the operations 101 and 102 may be implemented independently of each other, partially concurrently, periodically according to a predetermined time step, or even substantially continuously (in "real time").

In a third operation 104, switching to the scheduled supply mode is ordered if conditions corresponding to the scheduled supply mode are met (according to the results of the data analysis). If conditions corresponding to the scheduled supply mode are not met, switching to the scheduled supply mode is blocked, either by an order for blocking changing the scheduled supply mode, or because there was no order. It is specified that, in the specific case where the scheduled supply mode should correspond to the current supply mode, the order may further be inhibited or be without perceptible effect: the current supply mode is retained/maintained.

The third operation 104 may include a comparison of the results of the analysis to parameters/criteria associated with the supply mode and/or the timeslot which is associated with it such as stored in the matching table 22, for example. In that way, verification of meeting the conditions corresponding to the scheduled supply mode has the form of such comparison. The results of the comparison are for example binary: "the conditions are met" or "the conditions are not met."

In that way, the driving of the supply of the access gateway 1 is made dependent both on a preestablished schedule (depending on the current date) and also dependent on the current activity of said access gateway 1. That done, the driving of the supply, and therefore the effects in terms of energy savings, are made particularly fine and flexible: the energy consumption can be limited while also being able to reduce, or even eliminate, the consequences in terms of unavailability of said access gateway 1 for services actually used. In other words, the compromise between the effectiveness of the access gateway 1 and the energy consumption thereof is easier and improved. From a user's perspective, the coupling of the energy supply is made "transparent" or "painless," which contributes to a better acceptance of consumption limiting measures, to a reduction of the risk of working around or neutralizing the energy limiting measures at the initiative of the human user, and therefore, in the end and in practice, to an improvement of the energy use moderation of the access gateway.

Further, implementing such driving methods involves the availability of hardware components commonly on sale and in existing equipment. It is therefore technically possible to implement such methods with software updates without physical intervention on some existing units.

In the example shown in FIG. 2, the embodiment comprises an optional fourth operation 105. The fourth operation 105 comprises sending a notification intended for a device 41 distinct from the access gateway 1 such as a smart phone available to a user. Here "notification" designates any data, signal or order which can be interpreted by said device 41 for next sending information perceptible and understandable by a human user. Said information may for example be that of the blocking of switching to the scheduled supply mode. It may further include the reasons for such a blocking. Solely for illustration, the information may be a message displayed by the device 41 indicating: "According to your settings, your Livebox should've gone into deep standby at 9 PM. However, it appears that at least one of the members of your household is currently using a video on demand service. Switching to deep standby mode is therefore suspended."

In the embodiments, it may be provided that upon receiving an order, switching to the scheduled supply mode, or another supply mode, may be forced independently of the scheduled supply mode and/or meeting/not meeting the conditions. In other words, a user may be allowed the possibility of imposing a supply mode by bypassing the method described above by means of a human-machine interface. Such an order may be generated spontaneously (by a user) from a device 41 intended for the access gateway 1 or else result from an action in response to receiving a notification issued by the access gateway 1. Based on the above illustrative example, the message in the notification may for example be supplemented with an invitation to issue an order. For example, the preceding message may be supplemented with a question: "Do you want to force switching to deep standby mode?" and a "Yes" button whose activation triggers sending the order to the access gateway 1.

The notification and/or order invitation may for example be displayed on a screen of a smart phone and/or a display screen connected to the access gateway 1. Of course, the purpose of the aforementioned examples as to the form and way in which the notifications are sent and also the aspects about the presentation of information which may follow from it is to improve the reader's understanding, and they are in no way limiting and will be adapted to the application context.

In some embodiments, a series of operations such as described above may be repeated. In other words, the described method examples may form a loop and be repeated periodically, even continuously. In that way, the switch to the scheduled supply mode may be suspended so long as the conditions are not met and then be triggered upon meeting the conditions. For example, the access gateway 1 may switch into "deep standby" mode upon stopping using VOD even though such a switch was planned earlier.

In some embodiments, the various supply modes are sequenced relative to each other as a function of the nominal energy consumption associated with each mode. In these embodiments, an additional and optional operation may be implemented after the third operation 103: if conditions corresponding to a scheduled supply mode are not met by the analyzed data, and conditions corresponding to a supply mode associated with a greater energy consumption than that associated with the scheduled supply mode are met, then the command for switching to said supply mode with energy consumption greater than that associated with the scheduled supply mode is sent. This way the alignment of the energy consumption with the current use can be further improved. In fact, a low energy consumption use may be preserved while inhibiting a scheduled total or nearly total interruption of the energy, all while reducing the energy consumed from a quantity unnecessary for maintaining the use. In the case of a large number of possible supply modes (three or more), it is possible to specifically repeat several times the implementation of the third operation 103 (partial loop) in order to reach a supply mode best suited to the current use.

In some specific embodiments, for a given supply mode, it is possible to reduce the energy consumption by deactivating all the active processor cores which are not necessary to the operation of the current activity. For example, instead of going into "deep standby" supply mode, the supply mode stays in "light standby," but the consumption of this "light standby" mode is reduced.

In these embodiments, there are at least four supply modes. The supply modes may each be associated with an energy consumption distinct from the other modes.

For illustration, the set of supply modes may comprise the following modes ordered in the following order: a first mode, for example, described as "off," associated with no consumption; a second mode, for example, described as "deep standby," associated with a low but nonzero consumption; a third mode, for example, described as "light standby," associated with a limited high consumption; a fourth mode, for example, described as "active," associated with unlimited consumption.

The existence of two distinct modes beyond a totally off mode and an unlimited activity mode allows, by an adaptation to the conditions to be met, authorizing some uses and not other uses based on associated energy consumption. In the example of Internet boxes, the configuration of the light standby may correspond to generally low energy consuming uses but where it is preferable to stay operational continuously such as telephony (without video flow) and domestic automation subsystems such as an alarm system. The deep standby may correspond to turning off all use except for driving the supply itself.

As an illustrative example, the schedule 21 may include "deep standby" supply mode every day between midnight and 5 AM. The matching table 22 may for its part include a condition to be met associated with the scheduled supply mode (here "deep standby"), and to the aforementioned timeslot (here midnight to 5 AM). The condition may be that TV services are inactive. Said condition may be limited to a part of the aforementioned timeslot, for example from midnight to 1 AM. In that way, when the current time changes from 11:59 AM to 0:00 AM, but a TV service is active, the supply mode is not changed. Beyond 1 AM, the supply mode may be changed and switched to "deep standby," even if the TV service is active.

In the preceding, the method is implemented locally, meaning by said access gateway 1 itself. As a variant, the implementation may in part be in remote mode, including via the wide communication network. In that way, the supply for the access gateway is driven remotely and receives commands from a distinct remotely hosted software component. The remote implementation of the driving method serves in particular to share the means and to remotely drive a plurality of access gateways.

INDUSTRIAL APPLICABILITY

The present technical solutions may be applicable in particular in network equipment configured for forming access gateways such as communication units called "Internet boxes" and intended to form interfaces between wide telecommunication networks and local communication networks, generally private.

The present disclosure is not limited to the examples of methods, units, computer programs and recording media for such programs described above, solely as examples, but it encompasses all variations which could be conceived by the person skilled in the art within the scope of the protection sought.

LIST OF REFERENCES NUMBERS

| | |
|---|---|
| 1: | Access gateway |
| 11: | Communication module |
| 12: | Supply management module |
| 13: | Analysis module |
| 21: | Schedule |
| 22: | Matching table |
| 23: | Internal clock |
| 30: | Wide communication network |
| 41: | Device |
| 42: | Device |
| 101: | Obtaining |
| 102: | Analyzing |
| 103: | Comparing |
| 104: | Ordering |
| 105: | Sending |

The invention claimed is:

1. A method for driving a supply of an access gateway, wherein the gateway allows at least one device of a local network to access a wide communication network, wherein the method is implemented by the access gateway and comprises:
   a) obtaining a scheduled supply mode based on a current date;
   b) analyzing data routed by the access gateway at the current date; and
   c) if the analyzed data meets conditions corresponding to the scheduled supply mode, ordering switching to the scheduled supply mode, and if the analyzed data does not meet conditions corresponding to the scheduled supply mode, switching to the scheduled supply mode is blocked.

2. The method according to claim 1, further comprising:
   d) if the conditions are not met, sending a notification intended for a device distinct from the access gateway.

3. The method according to claim 2, further comprising:
   e) in case of receiving an order in response to sending the notification, ordering switching to the scheduled supply mode.

4. The method according to claim 1, wherein the analysis of the data routed by the access gateway includes at least one of the following actions:
   detection of encapsulation of data according to predefined formats or standards;
   detection of HTTP and/or HTTPS requests;
   detection of RTCP frames;
   detection of physical ports used for routing data;
   detection of software ports used for routing data;
   detection of packets corresponding to voice transiting under IP protocol; and/or
   detection of packets corresponding to video transiting under IP protocol.

5. The method according to claim 1, further comprising:
   f) identifying one or several processor cores of the access gateway unused on the current date and deactivating the one or several unused processor cores.

6. The method according to claim 1, wherein obtaining the scheduled supply mode is done among several ordered supply modes that are ordered relative to each other based on energy consumption associated with each mode, and wherein
   c') if conditions corresponding to the scheduled supply mode are not met by the analyzed data; and
   if conditions corresponding to a supply mode associated with a greater energy consumption than that associated with the scheduled supply mode are respected, ordering switching to the supply mode associated with a greater energy consumption than that associated with the scheduled supply mode.

7. The method according to claim 1, wherein there are at least four supply modes, and each is associated with an energy consumption distinct from the other modes.

8. The method according to claim 1, further comprising a loop such that the method is reiterated so as to be implemented periodically or continuously.

9. A processing circuit comprising a processor and a memory, the memory storing program code instructions of a computer program for executing the method according to claim 1 when this computer program is executed by the processor.

10. A non-transitory computer-readable nonvolatile recording medium on which a computer program is recorded for executing the method according to claim 1 when this computer program is executed by a processor.

11. A unit comprising an access gateway, where the gateway allows at least one device of a local network to access a wide communication network, where the unit is configured for:
   a) obtaining a scheduled supply mode based on a current date;
   b) analyzing data routed by the access gateway at the current date; and
   c) if the analyzed data meets conditions corresponding to the scheduled supply mode, ordering switching to the scheduled supply mode, and if the analyzed data does not meet conditions corresponding to the scheduled supply mode, switching to the scheduled supply mode is blocked.

12. A method for driving a supply of an access gateway, wherein the gateway allows at least one device of a local network to access a wide communication network, wherein the method is implemented by the access gateway and comprises:
   a) obtaining a scheduled supply mode based on a current date;
   b) analyzing data routed by the access gateway at the current date; and
   c) if the analyzed data meets conditions corresponding to the scheduled supply mode, ordering switching to the scheduled supply mode,
      wherein obtaining the scheduled supply mode is done among several ordered supply modes that are ordered relative to each other based on energy consumption associated with each mode, and wherein
   c') if conditions corresponding to the scheduled supply mode are not met by the analyzed data; and
      if conditions corresponding to a supply mode associated with a greater energy consumption than that associated with the scheduled supply mode are respected, ordering switching to the supply mode associated with the greater energy consumption than that associated with the scheduled supply mode.

\* \* \* \* \*